United States Patent
Kobayashi et al.

(10) Patent No.: US 8,678,408 B2
(45) Date of Patent: Mar. 25, 2014

(54) TRAVEL DEVICE FOR TRANSPORT VEHICLE

(71) Applicants: Hiroki Kobayashi, Aichi (JP); Kazunari Sakurai, Aichi (JP)

(72) Inventors: Hiroki Kobayashi, Aichi (JP); Kazunari Sakurai, Aichi (JP)

(73) Assignees: Nippon Sharyo, Ltd., Aichi (JP); Central Japan Railway Company, Aichi (JP)

(*) Notice: Subject to any disclaimer, the term of this patent is extended or adjusted under 35 U.S.C. 154(b) by 0 days.

(21) Appl. No.: 13/899,169

(22) Filed: May 21, 2013

(65) Prior Publication Data

US 2013/0341883 A1 Dec. 26, 2013

(30) Foreign Application Priority Data

May 22, 2012 (JP) ................................ 2012-116288

(51) Int. Cl.
*B60G 9/02* (2006.01)
*B60G 3/02* (2006.01)

(52) U.S. Cl.
CPC .. *B60G 3/02* (2013.01); *B60G 9/02* (2013.01); *B60G 2300/0262* (2013.01); *B60G 2300/04* (2013.01); *B60G 2300/37* (2013.01)
USPC ................... 280/124.117; 280/6.155; 180/22

(58) Field of Classification Search
CPC .... B60G 9/02; B60G 3/02; B60G 2300/0262; B60G 2300/04; B60G 2300/37; B66F 9/24
USPC ................ 280/6.151, 6.155, 6.156, 124.117, 280/124.145, 124, 134, 124.112, 124.114; 180/22–24, 24.01
See application file for complete search history.

(56) References Cited

U.S. PATENT DOCUMENTS

| | | | | |
|---|---|---|---|---|
| 4,666,181 A | * | 5/1987 | Wegner | 280/6.151 |
| 4,943,078 A | * | 7/1990 | McGhie et al. | 280/408 |
| 6,024,184 A | * | 2/2000 | Kalkman et al. | 180/14.1 |
| 6,371,505 B1 | * | 4/2002 | Turner, II | 280/441.2 |
| 6,942,232 B1 | * | 9/2005 | McGhie | 280/124.112 |
| 7,213,824 B1 | * | 5/2007 | McGhie | 280/124.112 |
| 7,562,887 B1 | * | 7/2009 | Sutton et al. | 280/124.112 |
| 8,424,897 B1 | * | 4/2013 | Sutton et al. | 280/444 |
| 2007/0262552 A1 | * | 11/2007 | Sutton et al. | 280/124.157 |
| 2009/0273159 A1 | * | 11/2009 | Sutton | 280/419 |

FOREIGN PATENT DOCUMENTS

JP  11-246198  9/1999

* cited by examiner

*Primary Examiner* — Drew Brown
(74) *Attorney, Agent, or Firm* — Muramatsu & Associates

(57) ABSTRACT

Travel devices for a transport vehicle are arranged in a longitudinal direction and a width direction of a loading platform to allow traveling of the loading platform. In this travel device, an arm includes an upper end turnably supported at a lower portion of the loading platform. The arm includes a lower end where an axle box is supported swingably in up and down directions. A wheel has a mid-plane that intersects with a swing plane of an axle shaft disposed at the axle box, and is supported at the axle shaft. Accordingly, this ensures a small vehicle width L2 of the transport vehicle.

4 Claims, 6 Drawing Sheets

TRAVEL DEVICE FOR TRANSPORT VEHICLE

This application claims the benefit of foreign filing based on Japanese Application No. 2012-116288 filed May 22, 2012, the entire contents of which are incorporated herein by reference.

TECHNICAL FIELD

The present invention relates to a travel device for a transport vehicle, particularly, to a travel device for a transport vehicle that ensures a small vehicle width of the transport vehicle.

BACKGROUND ART

Conventionally, a known transport vehicle includes a loading platform and a plurality of travel devices as shown by Japanese Laid-Open Patent Publication No. 11-246198. Cargos such as a plant, a bridge, and a rolled steel coil are loaded on the loading platform. The plurality of travel devices are arranged in a longitudinal direction and a width direction of the loading platform. The respective travel devices are independently steerable. Steering the respective travel devices allows the transport vehicle to travel in any directions of front to back and left to right directions.

By referring to FIG. 5A to FIG. 6B, a description will be given of travel devices 201 of a transport vehicle 200 disclosed in Japanese Laid-Open Patent Publication No. 11-246198. FIG. 5A is a front view of the transport vehicle 200 that includes the conventional travel devices 201 and travels in a straight line. FIG. 5B is a front view of the transport vehicle 200 that traverses. FIG. 6A is a side view of the travel device 201 in the case where a wheel 207 is moved in an upward direction. FIG. 6B is a side view of the travel device 201 in the case where the wheel 207 is moved in a downward direction. In FIG. 5A, for ease of understanding, a motor 209 is omitted.

As illustrated in FIG. 5A and FIG. 5B, the travel devices 201 are arranged side by side at a lower portion of a loading platform 200a, and are devices that allow traveling of the loading platform 200a. The travel device 201 mainly includes an arm 202, a swing arm 203, a spindle 204, an axle box 205, wheels 207, and a shock absorber (a hydraulic cylinder) 208. The arm 202 includes an upper end supported at the lower portion of the loading platform 200a turnably in the horizontal direction around the vertical axis. The swing arm 203 includes one end supported at a lower end of the arm 202 swingably in up and down directions around the horizontal axis. The spindle 204 is disposed to protrude from a distal end of the swing arm 203 in the horizontal direction. The axle box 205 is journaled swingably to the spindle 204. The wheels 207 are rotatably supported at both sides of an axle shaft 206 disposed at the axle box 205. The shock absorber 208 is coupled to the arm 202 and the swing arm 203, and absorbs movement of the swing arm 203 in the up and down directions. The motor 209 is mounted on the axle box 205. The motor 209 is driven to rotatably drive the wheels 207.

As illustrated in FIG. 5A, the transport vehicle 200 can travel in a straight line by steering the travel devices 201 such that a width direction (a right-left direction as illustrated in FIG. 5A of the loading platform 200a is aligned with an axial direction of the axle shaft 206 and by driving the motor 209 to rotate the wheels 207. As illustrated in FIG. 5B, the transport vehicle 200 can traverse by steering the travel devices 201 such that a longitudinal direction (a vertical direction of the paper in FIG. 5B of the loading platform 200a is aligned with an axial direction of the axle shaft 206 and by driving the motor 209 to rotate the wheels 207.

As illustrated in FIG. 6A and FIG. 6B, the swing arm 203 of the travel device 201 swings in up and down directions corresponding to unevenness of a road surface G where the transport vehicle 200 travels. A horizontal distance L1 between the lower end of the arm 202 and a ground center n of the wheel 207 varies significantly in the case where: the swing arm 203 swings in the upward direction and then the wheel 207 moves in the upward direction (see FIG. 6A, and the swing arm 203 swings in the downward direction and then the wheel 207 moves in the downward direction (see FIG. 6B). Simultaneously, a relative position of the ground center n of the wheel 207 with respect to a turning center line R of the arm 202 varies significantly. Up and down swinging of the swing arm 202 and up and down movement of the wheel 207 that are associated with these changes are absorbed by the shock absorber 208.

SUMMARY OF INVENTION

Technical Problem

However, in the conventional travel device 201, the swing arm 203 and the wheel 207 are disposed, as illustrated in FIG. 5A, such that a swing plane S of the swing arm 203 becomes parallel to the mid-plane 1 of the wheel 207. Accordingly, the arm 202 and the swing arm 203 are disposed in shapes that considerably project out from the outer periphery of the wheel 207 considering the diameter of the wheel 207 to prevent interference with movement of the wheel 207 (see FIG. 6A and FIG. 6B). This results in a trajectory with a large radius of the arm 203 that turns with respect to the loading platform 200a.

In the transport vehicle 200, as illustrated in FIG. 5B, the travel devices 201 are arranged side by side in the width direction of the loading platform 200a considering respective turning radii of the arms 202 to avoid interference among the arms 202 that each turn with respect to the loading platform 200a at the lower portion of the loading platform 200a. A problem arises in that a trajectory with a large radius of the arm 202 that turns with respect to the loading platform 200a cannot meet requirements for ensuring the small vehicle width L2 of the transport vehicle 200.

The present invention has been made to address the above problem, and it is an object of the present invention to provide a travel device for a transport vehicle that ensures a small vehicle width of the transport vehicle.

Solution to Problem and Advantageous Effects of Invention

To achieve this object, with the travel device for the transport vehicle according to the first aspect, an arm includes an upper end turnably supported at a lower portion of the loading platform. An axle box is supported at a lower end of the arm swingably in the up and down directions. Movement of the axle box in the up and down directions is absorbed by a shock absorber coupled to the axle box and the arm. A wheel has a mid-plane that intersects with the swing plane of the axle shaft disposed at the axle box, and supported at the axle shaft. Accordingly, disposing the arm in a shape considering the width of the wheel prevents interference with movement of the wheel in the upward direction by the arm. A width of the wheel is smaller than a diameter of the wheel. This ensures a trajectory with a smaller radius of the arm and a smaller pitch between the travel devices arranged at the lower portion of the loading platform compared with a case where the arm is disposed in a shape considering the diameter of the wheel. This provides an advantageous effect that ensures a small vehicle width of the transport vehicle where a plurality of travel devices are arranged in the longitudinal direction and the width direction of the loading platform.

With the travel device for the transport vehicle according to the second aspect, the wheel has the mid-plane perpendicular to the swing plane of the axle shaft. In addition to the advantageous effect of the first aspect noted above, this provides an advantageous effect that reduces uneven wear of the wheel during traveling of the transport vehicle and prolongs the life of the wheel.

With the travel device for the transport vehicle according to the third aspect, the wheel has the ground center positioned on the turning center line of the arm with respect to the loading platform in the case where the vertical line with respect to the road surface is positioned on the mid-plane of the wheel. This reduces torque generated when the arm turns by steering. In addition to the advantageous effect of the first or second aspect noted above, this provides an advantageous effect that reduces a steering force.

With the travel device for the transport vehicle according to the fourth aspect, a plurality of the wheels are arranged side by side at the axle shaft. In addition to the advantageous effect of any one of the first to third aspects noted above, this provides an advantageous effect that ensures load resistant power and reduces ground contact pressure.

DESCRIPTION OF EMBODIMENTS

Figure 1A:
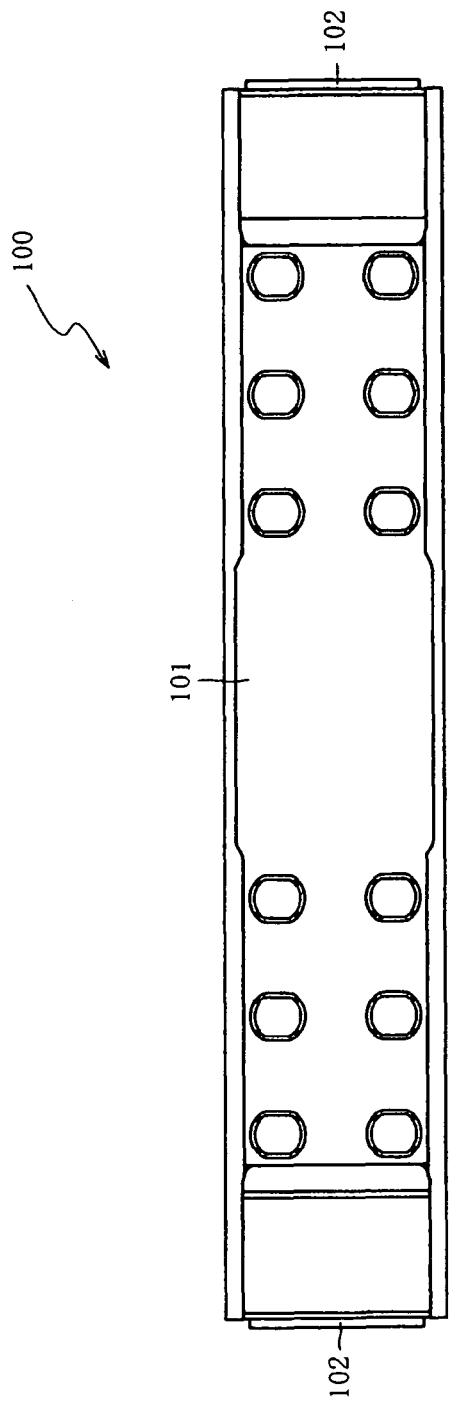
FIG. 1A is a plan view of a transport vehicle that includes travel devices according to a first embodiment.
Figure 1B:
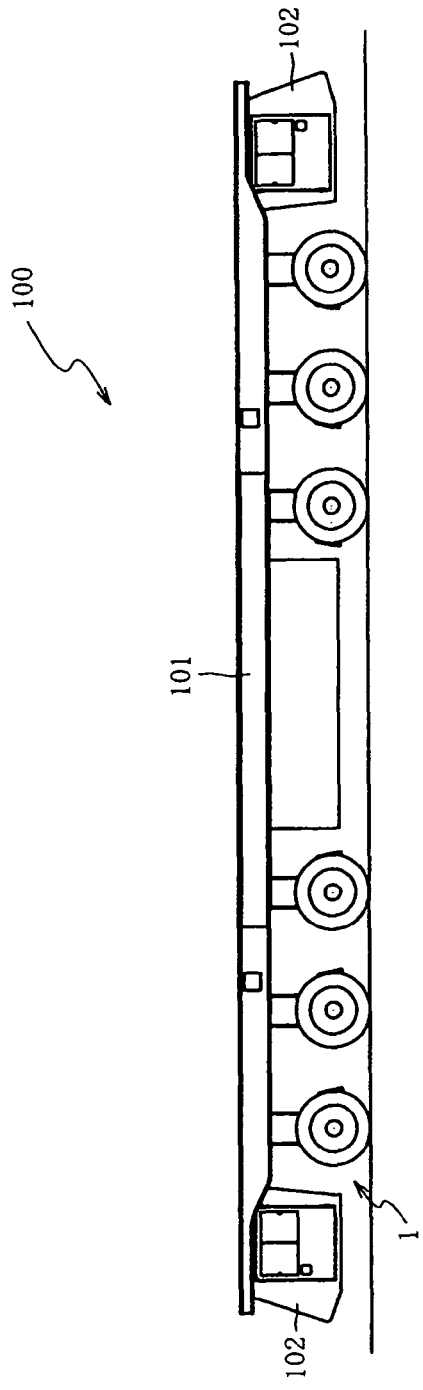
FIG. 1B is a side view of the transport vehicle.

Hereinafter, a description will be given of a preferred embodiment of the present invention with reference to the accompanying drawings. First, a description will be given of a travel device 1 of a transport vehicle 100 according to a first embodiment of the present invention by referring to FIG. 1A to FIG. 3B. First, a description will be given of a transport vehicle 100 by referring to FIG. 1. FIG. 1A is a plan view of the transport vehicle 100 that includes the travel devices 1 according to the first embodiment. FIG. 1B is a side view of the transport vehicle 100.

As illustrated in FIG. 1A and FIG. 1B, the transport vehicle 100 includes a loading platform 101, a driver's cabin 102 coupled to the loading platform 101, and a plurality of the travel devices 1 arranged in a longitudinal direction and a width direction of the loading platform 101. The driver's cabin 102 includes, in its inside, a driver's seat (not shown) with equipment for driving such as a traveling lever to steer a travel direction. A driver gets in the driver's cabin 102, and operates the equipment for driving (not shown). Thus, each travel device 1 is steered in any direction. In this embodiment, the driver's cabin 102 is disposed at both sides of the lower portion of the loading platform 101 in the longitudinal direction. Two sets of the travel devices 1 are disposed in the width direction of the loading platform 101 and six sets of the travel devices 1 are disposed in the longitudinal direction of the loading platform 101. In total, 12 travel devices 1 are arranged in the lower portion of the loading platform 101.

Figure 2A:
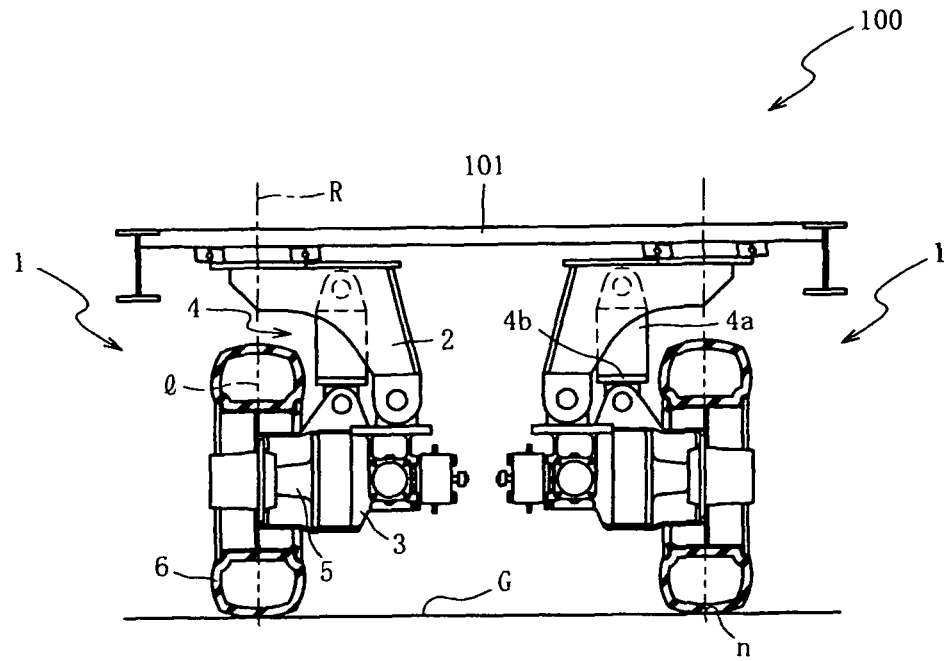
FIG. 2A is a front view of the travel devices of the transport vehicle that travels in a straight line.
Figure 2B:
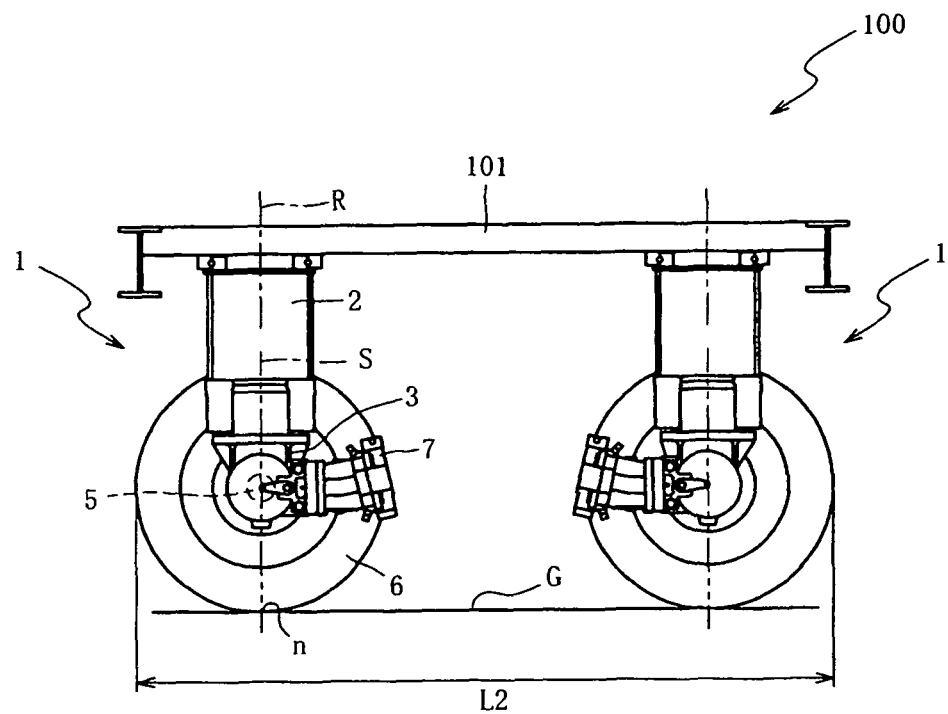
FIG. 2B is a front view of the travel devices of the transport vehicle that traverses.

Next, a description will be given of the travel device 1 by referring to FIG. 2. FIG. 2A is a front view of the travel devices 1 of the transport vehicle 100 that travels in a straight line. FIG. 2B is a front view of the travel devices 1 of the transport vehicle 100 that traverses. In FIG. 2A and FIG. 2B, for ease of understanding, the driver's cabin 102 (see FIG. 1) is omitted. In FIG. 2A, a partial cross-section of the wheel 6 is illustrated.

As illustrated in FIG. 2A and FIG. 2B, the travel device 1 mainly includes an arm 2, an axle box 3, a shock absorber 4, and a wheel 6. The arm 2 includes an upper end supported at the lower portion of the loading platform 101 turnably in the horizontal direction around the vertical axis. The axle box 3 includes an upper portion supported at a lower end of the arm 2 swingably in up and down directions around the horizontal axis. The shock absorber 4 is coupled to the axle box 3 and the arm 2, and absorbs swinging (movement) of the axle box 3 in the up and down directions. The wheel 6 is supported by an axle shaft 5 disposed at the axle box 3.

The axle shaft 5 is disposed at the axle box 3, and disposed to protrude from the axle box 3 toward a side where a turning center line R (the vertical axis) of the arm 2 is positioned. The wheel 6 is supported by the axle shaft 5. Accordingly, the axle shaft 5 that supports the wheel 6 is supported at one end of the arm 2. On the axle box 3, a hydraulic motor 7 is mounted. The axle box 3 is configured to transmit a driving force of the hydraulic motor 7 to the axle shaft 5. This rotates the axle shaft 5 by driving of the hydraulic motor 7 to rotate the wheel 6 supported by the axle shaft 5. Thus, the transport vehicle 100 travels.

The shock absorber 4 has a configuration that includes a hydraulic cylinder 4a and a rod 4b. The hydraulic cylinder 4a is swingably supported at an upper portion of the arm 2. The rod 4b is reciprocatably inserted into the hydraulic cylinder 4a. The rod 4b includes a distal end swingably supported at the upper portion of the axle box 3. The hydraulic cylinders 4a of all the travel devices 1 arranged in the lower portion of the loading platform 101 communicate with one another by piping of a hydraulic pressure circuit (not shown) at the loading platform 101. Thus, a pressure is applied to the shock absorbers 4 of a part of travel devices 1 arranged at the loading platform 101. This pressure is transmitted to the shock absorbers 4 of all the travel devices 1. As a result, the shock absorbers 4 of the travel devices 1 function as independent suspensions that absorb unevenness of the road surface G.

The wheel 6 is supported by the axle shaft 5 such that the mid-plane 1 (see FIG. 2A) of the wheel 6 is perpendicular to the swing plane S (a swing trajectory of the axle shaft 5, see FIG. 2B) of the axle shaft 5. This reduces uneven wear of the wheel 6 that swings right and left in a traveling direction of the transport vehicle 100 during traveling of transport vehicle 100. As a result, this prolongs the life of the wheel 6.

Figure 3A:
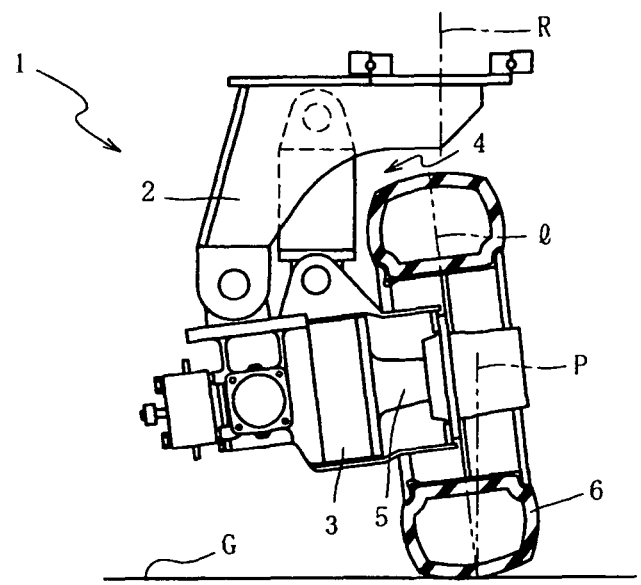
FIG. 3A is a front view of the travel device in the case where a wheel moves in an upward direction.
Figure 3B:
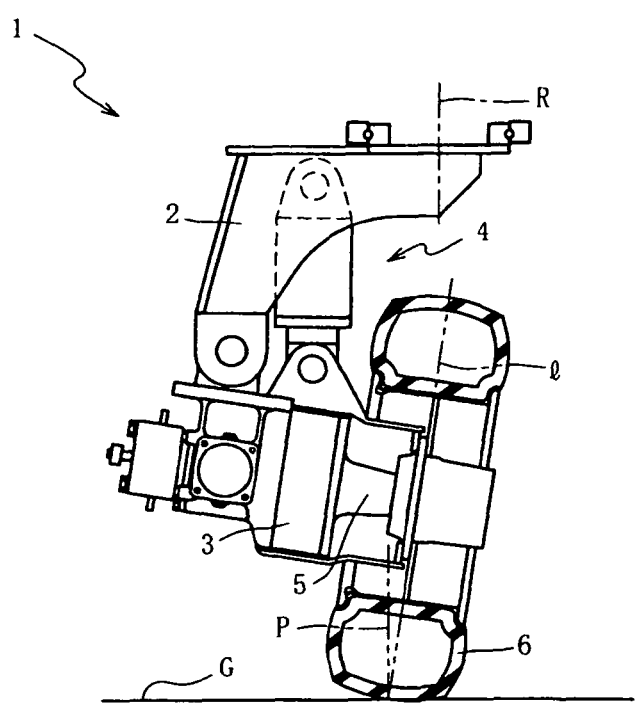
FIG. 3B is a front view of the travel device in the case where the wheel moves in a downward direction.

Next, an additional description will be given of the travel device 1 by referring to FIG. 3. FIG. 3A is a front view of the travel device 1 in the case where the wheel 6 moves in the upward direction. FIG. 3B is a front view of the travel device 1 in the case where the wheel 6 moves in the downward direction.

The wheel 6 has the mid-plane 1 (see FIG. 2A) that intersects with the swing plane S (see FIG. 2B) of the axle shaft 5 disposed at the axle box 3. As illustrated in FIG. 3A), the axle shaft 5 swings and the mid-plane 1 of the wheel 6 is inclined to the arm 2 side with respect to the vertical line P of the road surface G. Thus, the wheel 6 moves in the upward direction. On the other hand, as referred to in FIG. 3B), the axle shaft 5 swings and the mid-plane 1 of the wheel 6 is inclined to a side apart from the arm 2 with respect to the vertical line P of the road surface G. Thus, the wheel 6 moves in the downward direction. Accordingly, inclining the mid-plane 1 of the wheel 6 allows up and down movement of the wheel 6. This absorbs unevenness of the road surface G.

As illustrated in FIG. 2A), the vertical line P of the road surface G and the mid-plane 1 of the wheel 6 overlap with each other. The arm 2 and the wheel 6 are disposed such that the ground center n of the wheel 6 is positioned on the turning center line R of the arm 2 with respect to the loading platform 101 as illustrated in FIG. 2A in the case where the vertical line P is positioned on the mid-plane 1. The ground center n of the wheel 6 positioned on the turning center line R of the arm 2 reduces torque generated when the arm 2 turns in the horizontal direction with respect to the loading platform 101 by steering. As a result, this reduces a steering force. Additionally, this reduces the load on the wheel 6 and the steering gear (not shown) during steering (stationary steering) of the transport vehicle 100 in a state of vehicle stop.

Figure 6A:
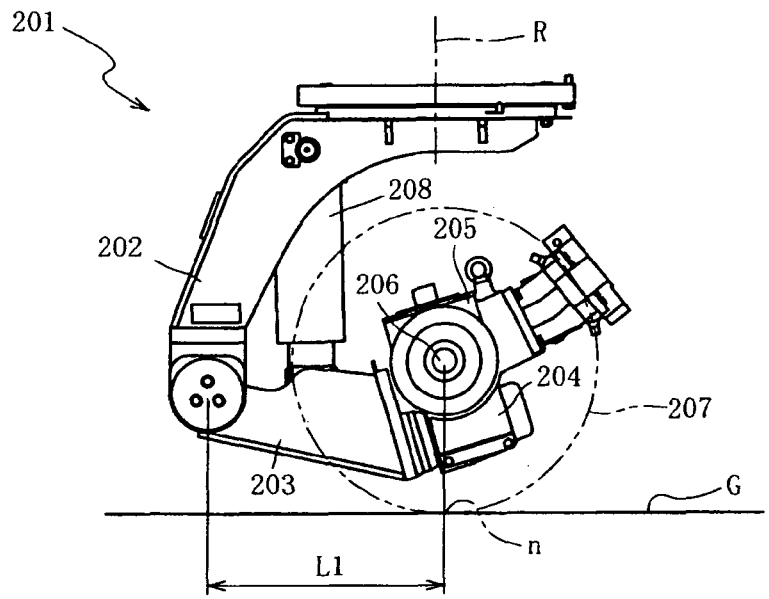
FIG. 6A is a side view of the conventional travel device in the case where a wheel moves in an upward direction.
Figure 6B:
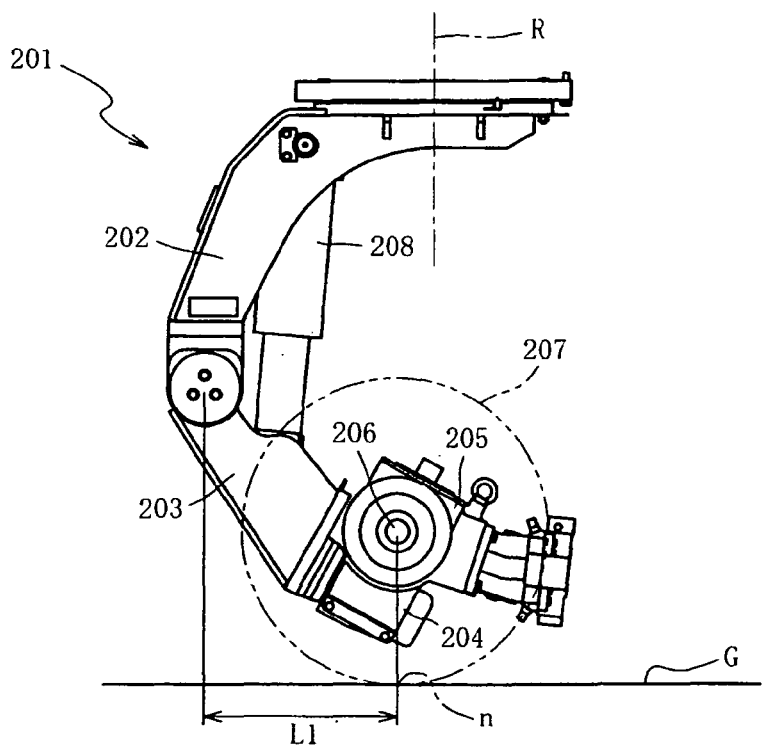
FIG. 6B is a side view of the travel device in the case where the wheel moves in a downward direction.

In the case where: the axle shaft 5 swings in the upward direction and then the wheel 6 moves in the upward direction (see FIG. 3A); and the axle shaft 5 swings in the downward direction and then the wheel 6 moves in the downward direction (see FIG. 3B), the relative position of the ground center n of the wheel 6 with respect to the turning center line R of the arm 2 changes only a little. This is because the travel device 1 is different from the conventional travel device 201 (see FIG. 6A and FIG. 6B) in that the mid-plane 1 of the wheel 6 is inclined with respect to the vertical line P to move the wheel 6 up and down. Accordingly, the effect that reduces the steering force of the travel device 1 can be provided not only in the case where the vertical line P is positioned on the mid-plane 1 of the wheel 6 but also in the case where the mid-plane 1 of the wheel 6 is inclined with respect to the vertical line P.

As described above, with the first embodiment, the arm 2 includes the upper end turnably supported at the lower portion of the loading platform 101. This allows independently steering the wheel 6. The axle box 3 is supported at the lower end of the arm 2 swingably in the up and down directions. Swinging (movement) of the axle box 3 in the up and down directions is absorbed by the shock absorber 4 coupled to the axle box 3 and the arm 2.

Figure 5A:
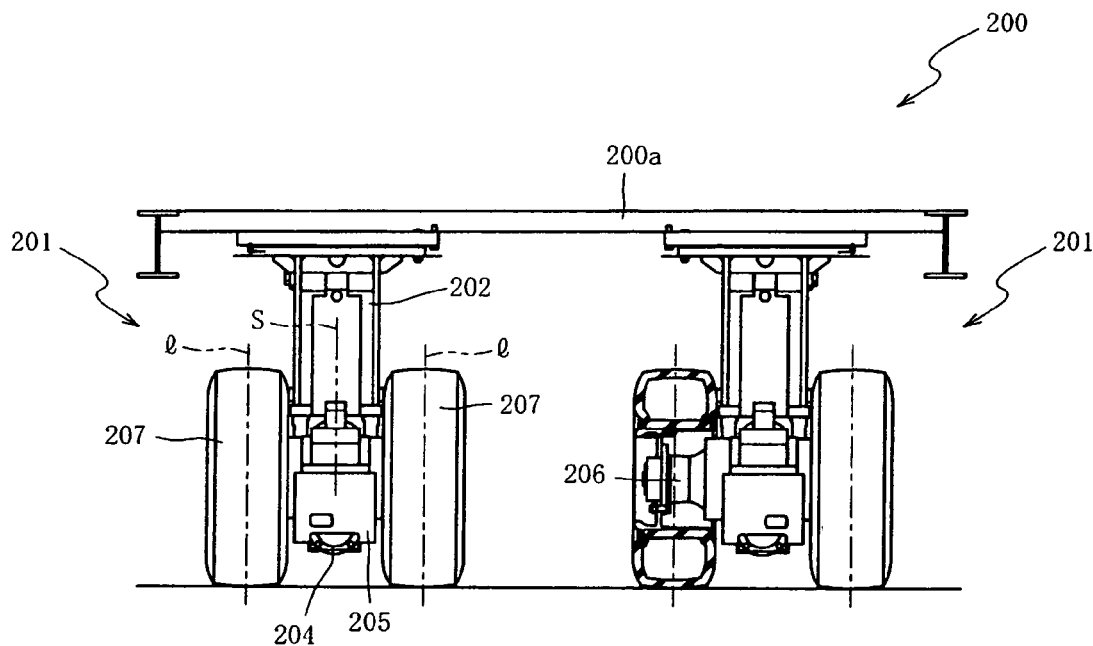
FIG. 5A is a front view of the transport vehicle that includes conventional travel devices and travels in a straight line.
Figure 5B:
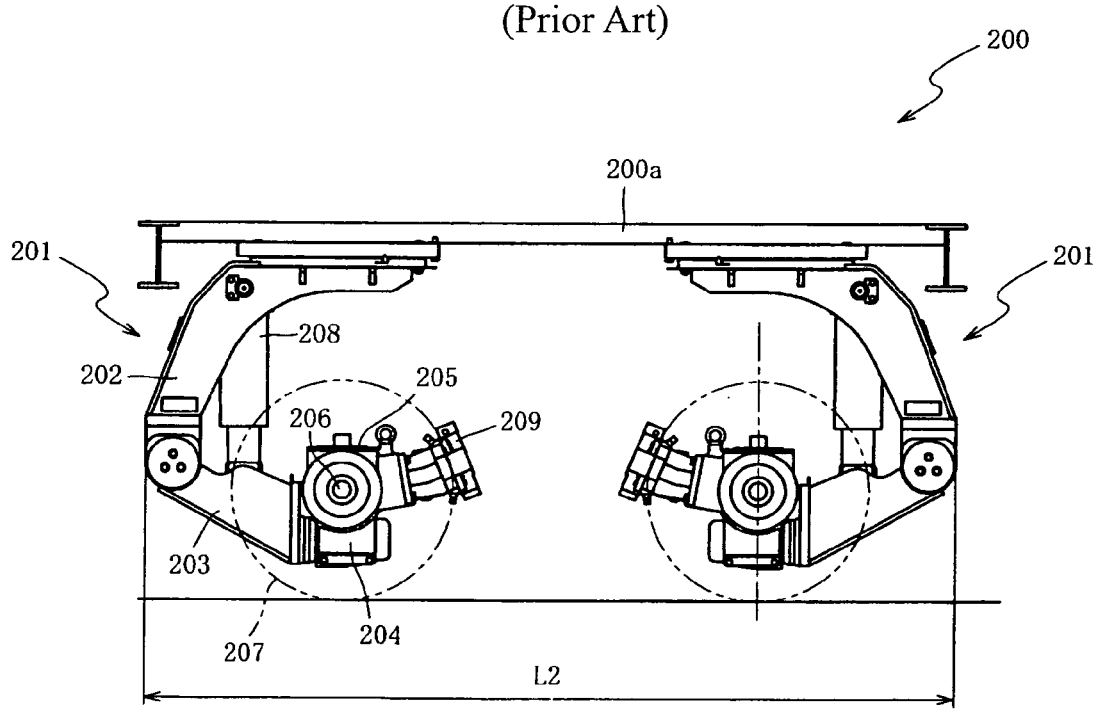
FIG. 5B is a front view of the transport vehicle that traverses.

Additionally, as illustrated in FIG. 2A and FIG. 2B, the wheel 6 has the mid-plane 1 that intersects with the swing plane S of the axle shaft 5 disposed at the axle box 3 while being supported by the axle shaft 5. Accordingly, disposing the arm 2 in a shape considering the width of the wheel 6 prevents interference with movement of the wheel 6 in the upward direction by the arm 2 (see FIG. 3A). The wheel 6 has a smaller width than the diameter of the wheel 6. This ensures the trajectory with a smaller radius of the arm 2 that turns and a smaller pitch between the travel devices 1 arranged at the lower portion of the loading platform 101 compared with the case where the arm 202 is disposed in a shape considering the diameter of the wheel 207 (see FIG. 5B). This ensures a smaller vehicle width L2 (see FIG. 2B) of the transport vehicle 100 where the plurality of travel devices 1 are arranged in the longitudinal direction and the width direction of the loading platform 101.

Figure 4:
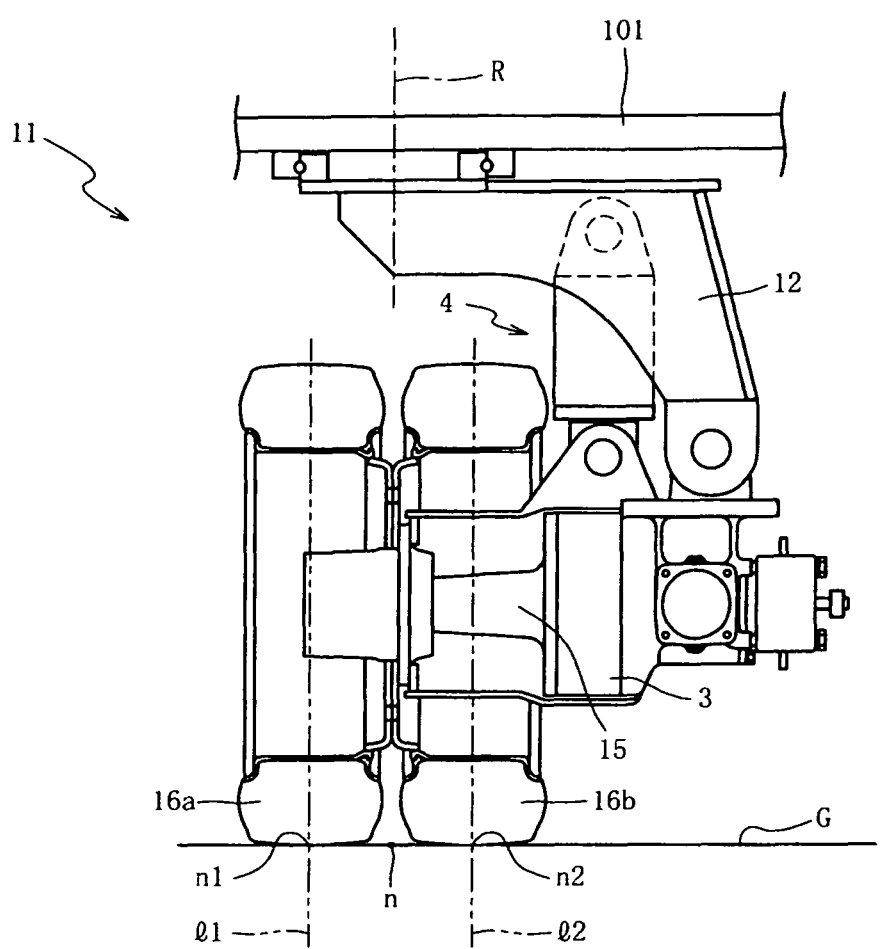
FIG. 4 is a front view of a travel device of a transport vehicle according to a second embodiment.

Next, a description will be given of a second embodiment by referring to FIG. 4. In the first embodiment, the case where the axle shaft 5 of the travel device 1 supports one wheel 6 has been described. In contrast; in the second embodiment, a case where a plurality of wheels 16 are arranged side by side at the axle shaft 15 will be described. Like reference numerals designate corresponding or identical elements to those of the first embodiment, and therefore such elements will not be further elaborated or simplified here. FIG. 4 is a front view of a travel device 11 according to the second embodiment.

As illustrated in FIG. 4, the travel device 11 mainly includes an arm 12, an axle shaft 15, and a plurality (two in this embodiment) of wheels 16 (16a and 16b). The arm 12 includes an upper end supported at the lower portion of the loading platform 101 turnably in the horizontal direction around the vertical axis (the turning center line R), and also includes a lower end where the axle box 3 is supported swingably in up and down directions around the horizontal axis. The axle shaft 15 is disposed at the axle box 3, and disposed to protrude toward the turning center line R side of the arms 2. The wheels 16 (16a and 16b) have the respective mid-planes 11 and 12 that intersect with the swing plane S (see FIG. 2B) of the axle shaft 15, and arranged side by side at the axle shaft 15. In the travel device 11, the plurality of wheels are arranged side by side at the axle shaft 15. This ensures load resistant power and reduces ground contact pressure.

The travel device 11 where two wheels 16a and 16b are arranged side by side at the axle shaft 15 has the ground center n at the midpoint between the respective ground centers n1 and n2 of the two wheels 16a and 16b. In the case where three or more wheels 16 are arranged side by side at the axle shaft 15, the ground center n is positioned at the midpoint between the ground centers of the wheels 16 at both ends. As illustrated in FIG. 4, in the travel device 11, the arm 12 and the wheel 16 are disposed such that the ground center n of the wheels 16 is positioned on the turning center line R of the arm 12 with respect to the loading platform 101. Similarly to the first embodiment, this reduces torque generated when the arm 12 turns with respect to the loading platform 101 by steering.

As described above, the present invention has been described based on the above-mentioned embodiments. It will be appreciated that the present invention will not be limited to the embodiments described above, but various modifications are possible without departing from the technical scope of the present invention. For example, the numerical values (such as the number of travel devices 1 arranged at the loading platform 101) described in the above-mentioned embodiments are examples. Other numerical values are obviously possible.

While in each embodiment above the travel device 1 or 11 used in the transport vehicle 100 where the driver's cabin 102 is disposed at the lower portion of the loading platform 101 on both sides in the longitudinal direction is described, this should not be construed in a limiting sense. The travel device 1 or 11 may obviously be used in other transport vehicles. The other transport vehicles include, for example, a transport vehicle where the driver's cabin 102 is disposed on one side of the loading platform 101 in the longitudinal direction and a transport vehicle in a unit carrier type where the driver's cabin 102 is removably attached to the loading platform 101.

While in each embodiment above the case where the travel device 1 or 11 includes the hydraulic motor 7 that receives operating oil to rotatably drive the wheel 6 or 16 is described, the transport vehicle 100 is not limited to the transport vehicle where the wheel 6 or 16 is rotatably driven by hydraulic pressure. For example, the present invention may obviously be applied to the travel device 1 or 11 of the transport vehicle 100 that receives electric power to rotatably drive the wheel 6 or 16 by an electric motor.

While in each embodiment above the case where the shock absorber 4 includes the hydraulic cylinder 4a, this should not be construed in a limiting sense. Other configurations are obviously possible. The other configurations include, for example, a coiled spring and an air suspension.

REFERENCE SIGNS LIST

1 and 11 . . . travel device
2 and 12 . . . arm
3 . . . axle box
4 . . . shock absorber
5 and 15 . . . axle shaft
6 and 16 . . . wheel
100 . . . transport vehicle
101 . . . loading platform
G . . . road surface
1, 11, and 12 . . . mid-plane
n . . . ground center
P . . . vertical line
R . . . turning center line
S . . . swing plane

What is claimed is:

1. A travel device for a transport vehicle, the travel devices being arranged in a longitudinal direction and a width direction of a loading platform, the travel device comprising:
    an arm that includes an upper end turnably supported at a lower portion of the loading platform;
    an axle box supported at a lower end of the arm swingably in up and down directions;
    a shock absorber coupled to the axle box and the arm, the shock absorber absorbing movement of the axle box in up and down directions; and
    a wheel that has a mid-plane intersecting with a swing plane of an axle shaft disposed at the axle box, the wheel being supported at the axle shaft.

2. The travel device for the transport vehicle according to claim 1, wherein the wheel has the mid-plane perpendicular to the swing plane of the axle shaft.

3. The travel device for the transport vehicle according to claim 1, wherein the wheel has a ground center positioned on a turning center line of the arm with respect to the loading platform in a case where a vertical line with respect to a road surface is positioned on the mid-plane.

4. The travel device for the transport vehicle according to claim 3, wherein a plurality of the wheels are arranged side by side at the axle shaft.

* * * * *